Oct. 24, 1950  R. I. C. HALE  2,527,129
AUTOMATIC GATE
Filed Feb. 2, 1945  2 Sheets-Sheet 1
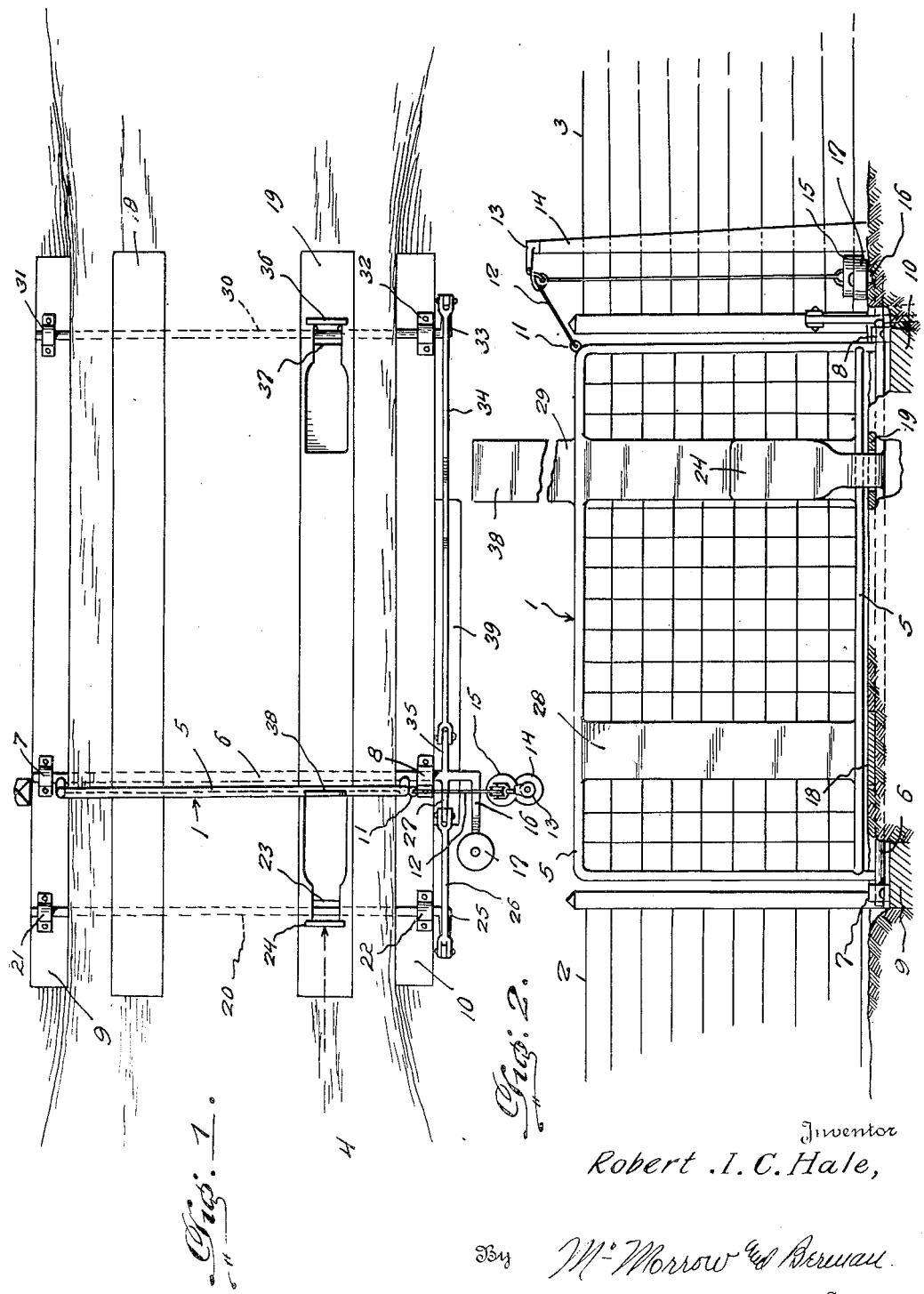
Inventor
Robert .I. C. Hale,
By McMorrow & Berman
Attorneys Oct. 24, 1950 R. I. C. HALE 2,527,129
AUTOMATIC GATE
Filed Feb. 2, 1945 2 Sheets-Sheet 2
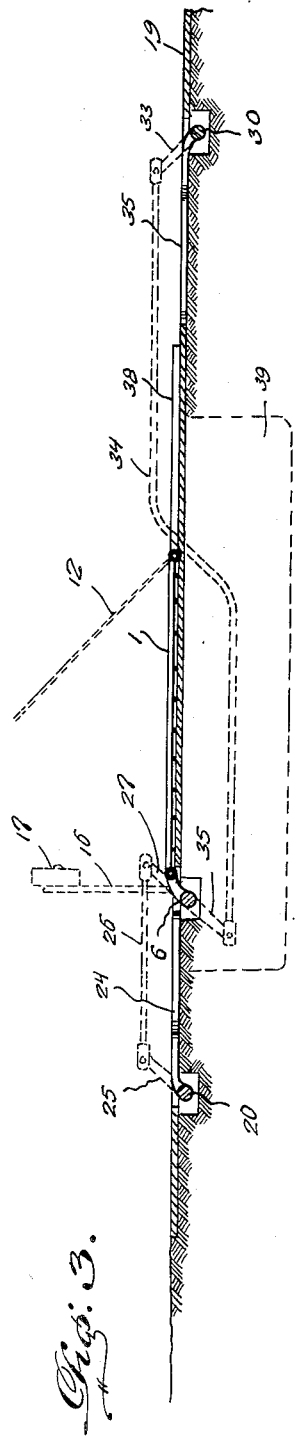
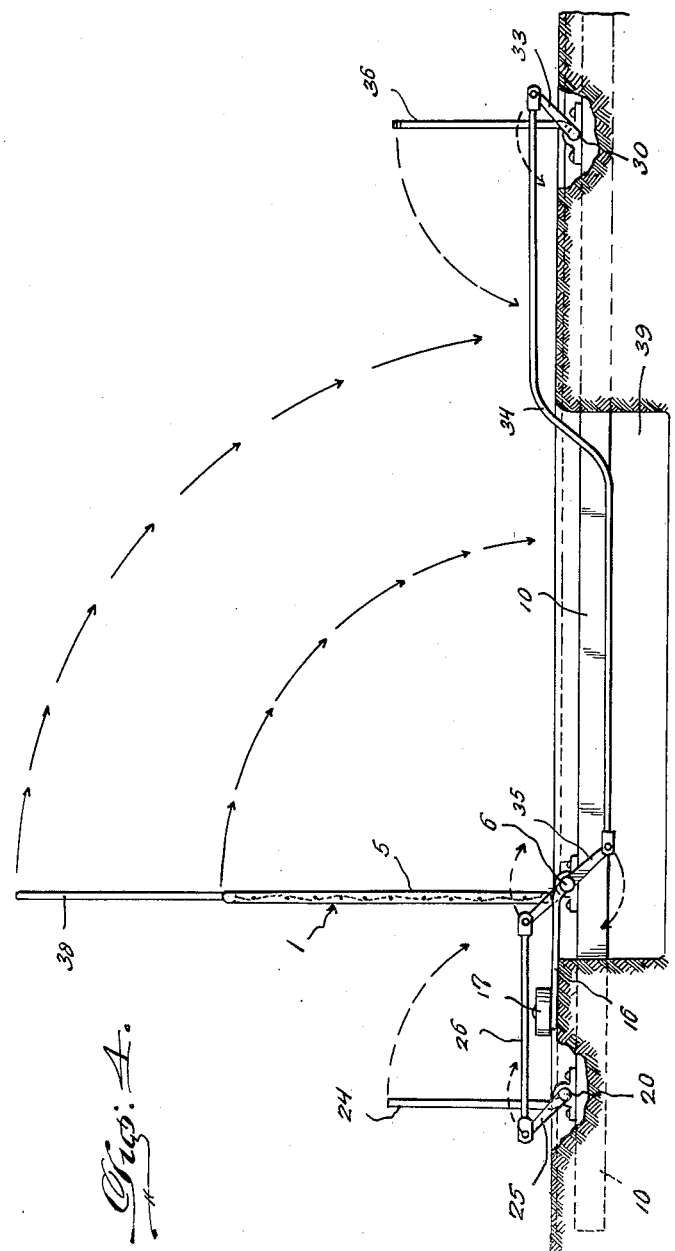
Inventor
Robert I. C. Hale,
By McMorrow & Berman
Attorneys Patented Oct. 24, 1950

2,527,129

UNITED STATES PATENT OFFICE 2,527,129

AUTOMATIC GATE

Robert I. C. Hale, New Castle, Ind.

Application February 2, 1945, Serial No. 575,759

1 Claim. (Cl. 39—18)

This invention relates to gates, and more particularly to an automatically operated gate adapted to be actuated by a vehicle approaching said gate.

A main object of this invention is to provide a gate for a fenced-off area, such as a stock grazing area, which can be automatically opened by a vehicle entering the area without the necessity of the driver descending from the vehicle.

A further object of this invention is to provide a simple gate mechanism opening automatically upon approach of a vehicle from either direction and closing automatically when the vehicle has passed through.

Further objects of the invention will become apparent from the following description and claim and from the accompanying drawings, wherein:

Figure 1 is a plan view of the gate of this invention and its operating mechanism.

Figure 2 is a front elevation of the gate of Figure 1 with certain parts in section, viewed from the approach side of the gate.

Figure 3 is a cross-sectional detail view showing the gate in open position such as would be the condition thereof if actuated by a vehicle passing through the gate.

Figure 4 is a side elevational view of the gate structure of Figure 1.

Referring to drawings, 1 designates a gate member interposed between fence sections 2 and 3 at roadway 4. Gate 1 comprises a rigid frame 5 provided with wire or other suitable fencing material in the body portion thereof. Gate 1 is rigidly secured to a horizontal shaft 6 at the base thereof, journaled in appropriate bearing members 7 and 8 mounted on supporting timber beams 9 and 10. At one of the top corners of frame 5 an eye member 11 is provided to which is secured a cable 12. Said cable 12 extends over a pulley provided on an arm 13 extending from a post 14, and carries a weight 15 which biases gate 1 to its raised position. Shaft 6 is provided with an extension 16 carrying an additional weight element 17.

A pair of stringer members 18 and 19 are positioned longitudinally of the roadway 4 adjacent gate 1 and are spaced apart a distance substantially equal to the distance between the wheels of a standard automobile or truck. Extending transversely of the roadway in advance of gate 1 is a shaft 20 journaled in bearing member 21 on beam 9 and bearing member 22 on beam 10. Said shaft 20 underlies stringers 18 and 19, said stringers being substantially flush with the roadway whereas beams 9 and 10 are relatively depressed with respect to the roadway surface. Stringer 19 is provided with an aperture 23 above the portion of shaft 20 adjacent thereto and a substantially flat baffle 24 formed with a bottom offset is rigidly secured to shaft 20 and projects through aperture 23. Said baffle 24 is normally maintained in vertical position by a linkage comprising an arm 25 provided at the end of shaft 20 and a link 26 pivotally secured to arm 25 at one end and pivotally secured to an arm 27 formed on shaft 6 at the other end. The offset at the bottom of paddle member or baffle 24 is sufficient to allow baffle 24 to be rotated to a flat position on stringer 19.

When a vehicle approaches the gate, the vehicle bumper, and then one of the front wheels contacts baffle 24 and rotates it to its flat position on stringer 19. By virtue of the above-described connecting linkage, this causes gate 6 to be rotated to its horizontal, non-obstructing position. As the vehicle continues its travel, the wheels pass onto tread elements 28 and 29 formed on gate 1 and supported on stringers 18 and 19, respectively, which carry the load.

A transverse shaft 30, similar to shaft 20, is provided on the inside of the enclosure, and is likewise journaled on bearing members 31 and 32 provided respectively on beams 9 and 10. A linkage comprising arm 33 formed at the end of shaft 30, offset link 34 and arm 35, formed on shaft 6, connects shaft 30 to gate 1. A baffle 36 is provided on shaft 30 and extends through an aperture 37 in overlying stringer member 19. Baffle 36 is provided with a bottom offset similar to that of baffle 24, but is rotated in an opposite direction. Tread element 29 of gate 1 is provided with an extension 38 adapted to cooperate with baffle 36 to provide a substantially continuous runway for a vehicle wheel passing over gate 1 from the direction of baffle 24. Baffle 24 is likewise of suitable length so that the vehicle wheel will roll directly onto tread element 29 from baffle 24 when the gate has been lowered. The paddle elements are therefore so arranged with respect to tread element 29 on gate 1 that the gate will continue to be held down until the vehicle has cleared baffle 36. Weights 15 and 17 will then lift the gate to raised position.

When the vehicle approaches from the opposite direction to leave the enclosure, the vehicle bumper will depress baffle 36 and by virtue of its connecting linkage will likewise lower gate 1. Said gate will remain in lowered position until the rear wheel of the vehicle has cleared baffle 24, whereupon weights 15 and 17 will again lift gate 1 to its raised position.

A suitable excavation 39 is provided for arm 35 and the lower portion of offset link 34.

While a specific embodiment of an automatic gate structure has been disclosed in the foregoing description, it will be understood that numerous modifications within the spirit of the invention will occur to those skilled in the art. Therefore, it is intended that no limitations be placed on the invention other than as defined by the scope of the appended claim.

What is claimed is:

A gate, comprising a horizontal rock shaft extending transversely of the road, a vertically swinging gate rigidly mounted upon the rock shaft to be moved to a raised position and a lowered horizontal position, tracks mounted upon the gate and extending longitudinally of the road, at least one track extending beyond the top of the gate, upper and lower cranks rigidly mounted upon the rock shaft and extending in opposite directions, a second rock shaft extending transversely of the road upon one side of the gate, a third crank rigidly mounted upon the second rock shaft and extending above the same, a link pivotally connected with the third crank and with the upper crank of the first rock shaft, a baffle rigidly mounted upon the second rock shaft and disposed to be engaged by the wheel of the vehicle and shifted to the horizontal position when the gate is swung to a horizontal position, a third rock shaft extending transversely of the road upon the opposite side of the gate, a fourth crank rigidly mounted upon the third rock shaft and extending above the same, a link pivotally connected with the fourth crank and the lower crank of the first rock shaft, a second baffle rigidly mounted upon the third rock shaft to be engaged by the wheel of the vehicle and to be swung to a horizontal position when the gate element is swung to the horizontal position, the arrangement being such that the first and second baffles swing inwardly toward each other when either baffle is swung downwardly by the wheel and the extended track of the gate will have its end arranged in close relation to the end of the lowered second baffle for forming a substantially continuous track, and weight operated means connected with the gate element to raise the same when released.

ROBERT I. C. HALE.

REFERENCES CITED

The following references are of record in the file of this patent:

UNITED STATES PATENTS

| Number | Name | Date |
|---|---|---|
| 730,290 | McElroy | June 9, 1903 |
| 1,047,925 | Doyle | Dec. 24, 1912 |
| 1,713,235 | Lowance | May 14, 1929 |
| 1,714,942 | Brobeck | May 28, 1929 |
| 1,837,941 | Baltzer | Dec. 22, 1931 |
| 1,944,349 | Kincaid | Jan. 23, 1934 |
| 2,256,662 | Blaker | Sept. 23, 1941 |